United States Patent
Bluemner et al.

(10) Patent No.: US 12,429,144 B2
(45) Date of Patent: Sep. 30, 2025

(54) CLEAN RINSING REVERSING BYPASS ROTARY VALVE

(71) Applicant: Northstar Medical Technologies, LLC, Beloit, WI (US)

(72) Inventors: Erik Bluemner, Verona, WI (US); Dorian Lust, Columbus, WI (US)

(73) Assignee: Northstar Medical Technologies LLC, Beloit, WI (US)

( * ) Notice: Subject to any disclaimer, the term of this patent is extended or adjusted under 35 U.S.C. 154(b) by 15 days.

(21) Appl. No.: 18/242,278

(22) Filed: Sep. 5, 2023

(65) Prior Publication Data

US 2024/0175512 A1    May 30, 2024

Related U.S. Application Data

(60) Provisional application No. 63/428,177, filed on Nov. 28, 2022.

(51) Int. Cl.
*F16K 31/05*    (2006.01)
*F16K 11/07*    (2006.01)
*F16K 11/074*    (2006.01)

(52) U.S. Cl.
CPC ........ *F16K 31/055* (2013.01); *F16K 11/0743* (2013.01)

(58) Field of Classification Search
CPC ... F16K 31/055; F16K 11/0743; F16K 11/074
USPC ........................................ 137/625.21, 625.46
See application file for complete search history.

(56) References Cited

U.S. PATENT DOCUMENTS

| | | | |
|---|---|---|---|
| 4,625,569 A * | 12/1986 | Toei | G01N 35/1097 |
| | | | 73/864.83 |
| 5,110,474 A | 5/1992 | Horwitz et al. | |
| 5,603,834 A | 2/1997 | Rogers et al. | |
| 5,707,525 A | 1/1998 | Rogers et al. | |
| 5,854,968 A | 12/1998 | Horwitz et al. | |
| 5,863,439 A | 1/1999 | Dietz et al. | |
| 5,888,397 A | 3/1999 | Rogers et al. | |
| 6,012,487 A * | 1/2000 | Hauck | F16K 11/0853 |
| | | | 137/625.46 |
| 6,511,603 B1 | 1/2003 | Dietz et al. | |
| 6,852,296 B2 | 2/2005 | Bond et al. | |
| 7,157,022 B2 | 1/2007 | Horwitz et al. | |
| 7,553,461 B2 | 6/2009 | Horwitz et al. | |
| 9,299,466 B2 | 3/2016 | Isensee et al. | |
| 9,336,912 B2 | 5/2016 | Isensee | |

(Continued)

OTHER PUBLICATIONS

McAlister, D.R et al, "Automated Two Column Generator Systems for Medical Radionuclides," Applied Radiation and Isotopes, vol. 67, issue 11, pp. 1985-1991, Nov. 2009. https://doi.org/10.1016/j.apradiso.2009.07.019.

(Continued)

*Primary Examiner* — Kelsey E Cary
(74) *Attorney, Agent, or Firm* — Husch Blackwell LLP (57) ABSTRACT

A clean rinsing revering bypass rotary valve is provided. The valve can include a rotor and a stator. The stator can include one or more flow-through holes, each coupled to a fluid conduit in a valve housing. The rotor can include one or more rotor conduits. The rotor conduits can interact with the flow-through holes of the stator to create one or more configuration combos, each with a distinctive fluid flow path.

20 Claims, 6 Drawing Sheets

(56) References Cited

U.S. PATENT DOCUMENTS

| | | | |
|---|---|---|---|
| 2010/0032604 A1* | 2/2010 | Wilen | G01N 30/20 |
| | | | 251/304 |
| 2010/0127200 A1* | 5/2010 | Kallback | G01N 35/1095 |
| | | | 251/304 |
| 2015/0165341 A1 | 6/2015 | Isensee | |

OTHER PUBLICATIONS

Gula, M. et al, "Separation, Concentration, and Immobilization of Technetium and Iodine from Alkaline Supernate Waste," Final Report by Eichrom Industries, Inc. for U.S. Department of Energy, Office of Fossil Energy, Federal Energy Technology, Center, Morgantown, West Virginia, Dec. 7, 1998 (100 pages).

Bond, A.H. et al, "Design, Synthesis, and Uptake Performance of ABEC Resins for the Removal of Pertechnetate from Alkaline Radioactive Wastes," Ind. Eng. Chem. Res. 1999, 38, 4, pp. 1676-1682. https://doi.org/10.1021/ie980072n.

Bond, A.H. et al., "Flowsheet Feasibility Studies Using ABEC Resins for Removal of Pertechnetate from Nuclear Wastes," Ind. Eng. Chem. Res. 1999, 38, 4, pp. 1683-1689. https://doi.org/10.1021/ie980611o.

Argyrou, M. et al, "Rhenium-188 Production in Hospitals, by w-188/re-188 Generator, for Easy Use in Radionuclide Therapy," Int J Mol Imaging. 2013; 2013:290750. doi: 10.1155/2013/290750.

Horwitz, E.P. et al., "A Lead-Selective Extraction Chromatographic Resin and its Application to the Isolation of Lead from Geological Samples," Analytica Chimica Acta, vol. 292, issue 3, Jul. 11, 1994, pp. 263-273. https://doi.org/10.1016/0003-2670(94)00068-9.

International Preliminary Report on Patentability & Written Opinion, re application No. PCT/US2023/031989, dated May 27, 2025.

* cited by examiner

CLEAN RINSING REVERSING BYPASS ROTARY VALVE

CROSS-REFERENCE TO RELATED APPLICATION

This application claims the benefit of the filing date of U.S. provisional application Ser. No. 63/428,177, filed Nov. 28, 2022, entitled, "Clean Rinsing Reversing Bypass Rotary Valve", which is hereby incorporated by reference as if fully set forth herein.

TECHNICAL FIELD

This disclosure generally relates to a valve. More specifically, this disclosure relates to a rotary valve.

BACKGROUND

The radioisotope technetium-99m (Tc-99m) is the standard of care in diagnostic imaging to assess the extent and severity of heart disease and cancer. U.S. hospitals use Tc-99m in over 40,000 diagnostic imaging procedures every day.

Its parent isotope, molybdenum-99 (Mo 99), can be produced via neutron capture technology. Source vessels containing Mo-99 can then be shipped to radiopharmacies throughout the U.S., where Tc-99m can be separated and eluted from Mo-99.

Rotary valves, which utilize a rotor disc and a stator disc to select fluid pathways, have existed since the 1970s. The typical arrangement is a center main port with a number of eccentrically located ports on the stator, and a slot on the rotor that can be turned to connect the center main port with one of the eccentrically located stator ports. Alternative arrangements including a multitude of slots on the rotor that can be used to direct flow between more than one pathway have also been used.

To accomplish the specific through, reversing, and bypass functionalities, a multitude of both valves and flow paths have been necessary. However, the resulting valve requires significant volumes of fluid to rinse and clean the flow paths and components.

Alternatively, to achieve reversing and bypass functionalities, a multitude of switching/shuttle valves found in typical fluid control applications have also been used, but several valves and more than one flow path are required to accomplish this.

Thus, there is a need for a valve to address these and other deficiencies in existing valve design.

BRIEF SUMMARY

A first aspect of this disclosure pertains to a valve including a rotor coupled to a stator, wherein the rotor and the stator are configured to form a first configuration having a first fluid pathway and a second configuration having a second fluid pathway such that the first fluid pathway is different from the second fluid pathway.

A second aspect of this disclosure pertains to the valve of the first aspect, wherein the rotor and the stator are further configured to form a third configuration having a third fluid pathway different from the first fluid pathway or the second fluid pathway.

A third aspect of this disclosure pertains to the valve of the second aspect, wherein the stator further includes a first flow-through hole, a second flow-through hole, a third flow-through hole, and a fourth flow-through hole.

A fourth aspect of this disclosure pertains to the valve of the third aspect, wherein the stator further includes a stator conduit provided on a surface of the stator.

A fifth aspect of this disclosure pertains to the valve of the fourth aspect, wherein the rotor further includes a first rotor conduit, a second rotor conduit, and a third rotor conduit, each provided on a surface of the rotor.

A sixth aspect of this disclosure pertains to the valve of the fifth aspect, wherein two of the first flow-through hole, the second flow-through hole, the third flow-through hole, or the fourth flow-through hole are coupled to a tube forming an external loop external of the valve.

A seventh aspect of this disclosure pertains to the valve of the second aspect, wherein the rotor is rotatable and the first configuration, the second configuration, and the third configuration are formed depending on a rotational position of the rotor relative to the stator.

An eighth aspect of this disclosure pertains to the valve of the sixth aspect, wherein the first configuration is formed by the first flow-through hole being in fluid communication with the third flow-through hole through the third rotor conduit, the third flow-through hole being in fluid communication with the fourth flow-through hole through the external loop, the fourth flow-through hole being in fluid communication with the second flow-through hole through the first rotor conduit, the stator conduit, and the second rotor conduit.

A ninth aspect of this disclosure pertains to the valve of the sixth aspect, wherein the second configuration is formed by the first flow-through hole being in fluid communication with the fourth flow-through hole through the first rotor conduit, the fourth flow-through hole being in fluid communication with the third flow-through hole through the external loop, and the third flow-through hole being in fluid communication with the second flow-through hole through the third rotor conduit.

A tenth aspect of this disclosure pertains to the valve of the sixth aspect, wherein the second configuration is formed by the first flow-through hole being in fluid communication with the second flow-through hole through the second rotor conduit.

An eleventh aspect of this disclosure pertains to the valve of the third aspect further including a housing coupled to the stator, wherein the housing includes a plurality of conduits each coupled to one of the first flow-through hole, the second flow-through hole, the third flow-through hole, and the fourth flow-through hole.

A twelfth aspect of this disclosure pertains to a method for creating a flow path including providing a rotor and a stator, and providing a first fluid pathway and a second fluid pathway by rotating the rotor relative to the stator, wherein the first fluid pathway is different from the second fluid pathway.

A thirteenth aspect of this disclosure pertains to the method of the twelfth aspect further includes providing a third fluid pathway by rotating the rotor relative to the stator, wherein the third fluid pathway is different from the first fluid pathway or the second fluid pathway.

A fourteenth aspect of this disclosure pertains to the method of the thirteenth aspect, wherein the stator further includes a first flow-through hole, a second flow-through hole, a third flow-through hole, and a fourth flow-through hole; and a stator conduit provided on a surface of the stator.

A fifteenth aspect of this disclosure to the method of the fourteenth aspect, wherein the rotor further includes a first rotor conduit, a second rotor conduit, and a third rotor conduit, each provided on a surface of the rotor.

A sixteenth aspect of this disclosure to the method of the fifteenth aspect further includes providing an external loop by coupling two of the two of the first flow-through hole, the second flow-through hole, the third flow-through hole, or the fourth flow-through hole.

A seventeenth aspect of this disclosure to the method of the sixteenth aspect, wherein the first fluid pathway is formed by rotating the rotor such that the first flow-through hole is in fluid communication with the third flow-through hole through the third rotor conduit, the third flow-through hole is in fluid communication with the fourth flow-through hole through the external loop, the fourth flow-through hole is in fluid communication with the second flow-through hole through the first rotor conduit, the stator conduit, and the second rotor conduit.

An eighteenth aspect of this disclosure to the method of the sixteenth aspect, wherein the second fluid pathway is formed by rotating the rotor such that the first flow-through hole is in fluid communication with the fourth flow-through hole through the first rotor conduit, the fourth flow-through hole is in fluid communication with the third flow-through hole through the external loop, and the third flow-through hole being in fluid communication with the second flow-through hole through the third rotor conduit.

A nineteenth aspect of this disclosure to the method of the sixteenth aspect, wherein the third fluid pathway is formed by rotating the rotor such that the first flow-through hole is in fluid communication with the second flow-through hole through the second rotor conduit.

A twentieth aspect of this disclosure to the method of the fourteenth aspect further includes providing a housing, wherein the housing includes a plurality of conduits each coupled to one of the first flow-through hole, the second flow-through hole, the third flow-through hole, and the fourth flow-through hole.

Before explaining the disclosed embodiment of this disclosure in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While this invention is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

Figure 1:
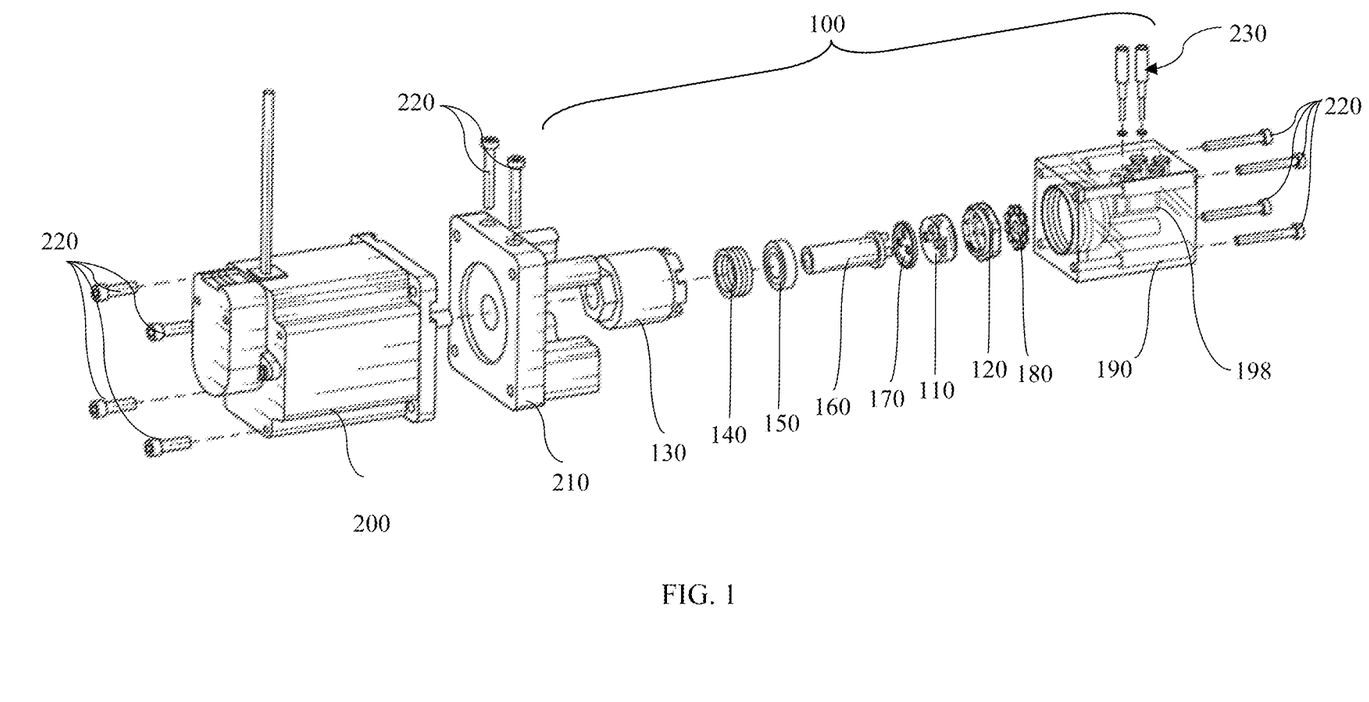
FIG. 1 illustrates a perspective exploded view of a 3-way valve, according to some embodiments.

As shown in FIGS. 1-6, the embodiments of this disclosure include a valve having a rotor and a stator. Referring to FIG. 1, a valve 100 according to some embodiments is shown in an exploded view. The valve 100 can include a rotor 110 and a stator 120. The rotor 110 can be coupled to a valve cap 130 via a spring 140, a bearing 150, a drive shaft 160, and a thrust washer 170. The stator 120 can be coupled to a stator seal 180 and a valve housing 190. The valve 100 can further be coupled to a motor 200 through a motor mount 210.

One or more fasteners 220 can be provided to secure the valve housing 190 with the motor 200. In an embodiment, the fasteners 220 can extend through the valve housing 190 to be affixed onto the motor mount 220. Additional fasteners 220 can also be provided to secure the motor 200 onto the motor mount 210. Thus, when assembled, both the valve housing 190 and the motor 200 can be secured onto the motor mount 210 via one or more fasteners 220. In additional embodiments, the valve housing 190 can be secured onto the motor 200 directly. In some embodiments, one or more conductivity probes 230 can be provided and installed in the valve housing 190.

Figure 2:
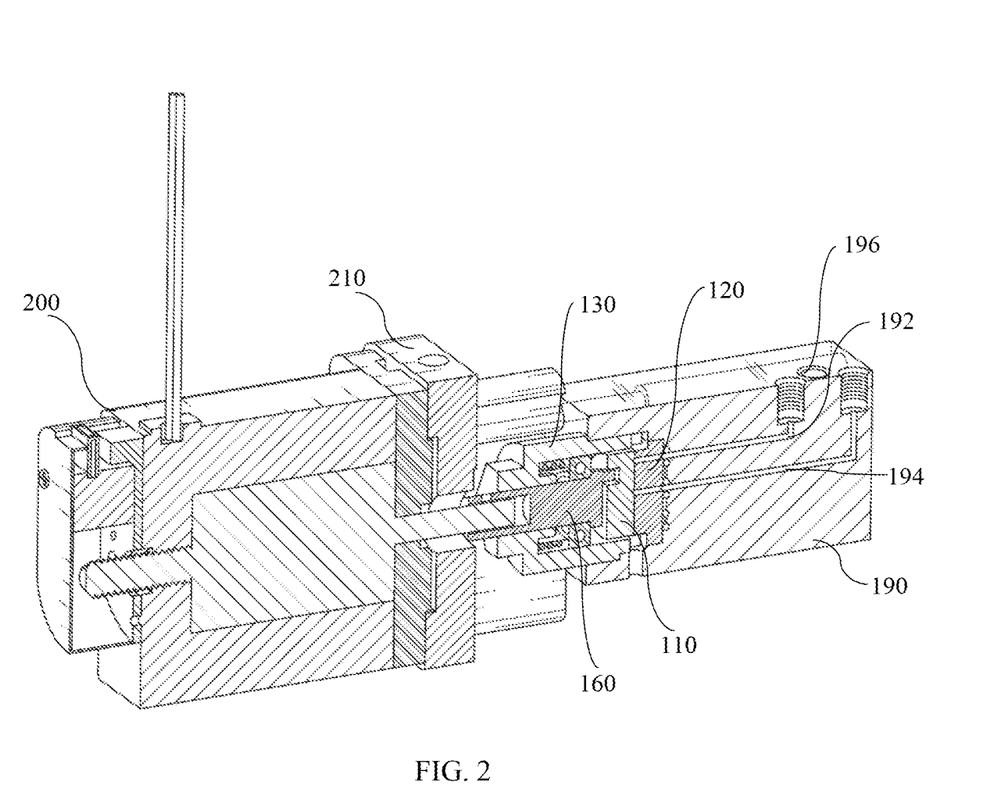
FIG. 2 illustrates a cross-sectional view of the 3-way valve of FIG. 1.

Referring to FIG. 2, in an embodiment, the motor 200 can be configured to engage the drive shaft 160 as shown in FIG. 2. The drive shaft 160 can be engaged to the rotor 110. Thus, the motor 200 can be configured to drive the rotor 110 through the drive shaft 160. In an embodiment, the motor 200 can be configured to rotate the rotor 110 in one or more directions (such as forward and/or reverse or clockwise and/or counterclockwise). In additional embodiments, a motor 200 can be replaced with other torque-creating devices. For example, a rotational position of the rotor 110 can be manipulated manually via a wrench or other appropriate devices.

One or more conduits can be provided in the valve housing 190. In an illustrated embodiment shown in FIG. 2, a first conduit 192, a second conduit 194, a third conduit 196, and a fourth conduit 198 (see FIG. 1) can be provided. As can be appreciated, more or fewer conduits can also be provided and are contemplated herein. The one or more conduits can be in fluid communication with one or more external components, thus serving as an input or an output depending on a direction of a fluid flow. The one or more conduits can also be interconnected, thus serving as an internal flow loop.

One or more flow-through holes can be provided on the stator 120. The flow-through holes can be bores that extend through the stator 120, allowing fluid to traverse from a first surface 121 of the stator 120 to a second surface 123 of the stator opposite from the first surface. Referring to an illustrated embodiment shown in FIG. 3, the stator 120 can include a first flow-through hole 122, a second flow-through hole 124, a third flow-through hole 126, and a fourth flow-through hole 128. The flow-through holes can be in fluid communication with the one or more conduits. For example, the first flow-through hole 122 can be in fluid communication with the first conduit 192. The second flow-through hole 124 can be in fluid communication with the third conduit 196. The third flow-through hole 126 can be in fluid communication with the second conduit 194, and the fourth flow-through hole 128 can be in fluid communication with the fourth conduit 198.

Figure 3:
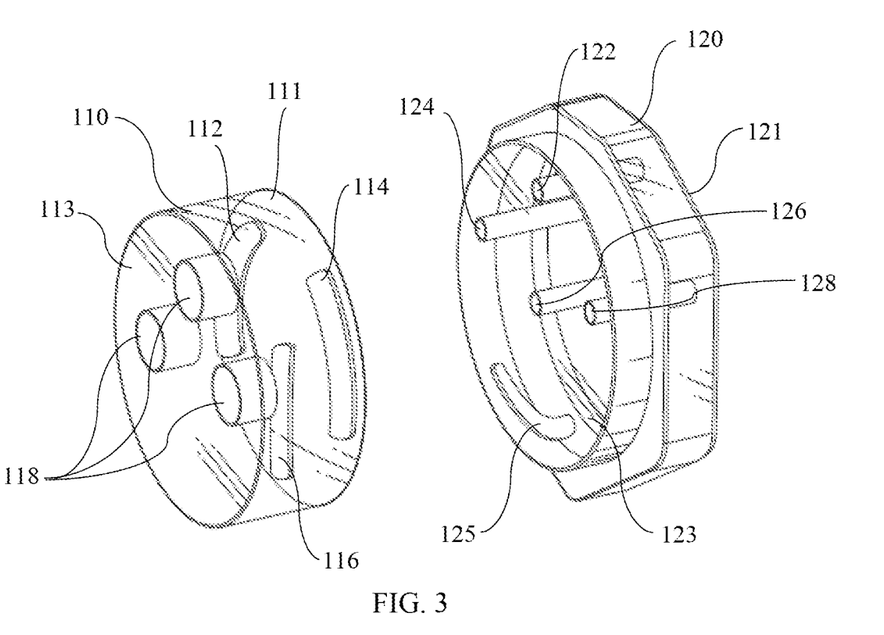
FIG. 3 illustrates a transparent view of a rotor and a stator of the 3-way valve of FIG. 1.

The flow-through holes 122, 124, 126, and 128 can be spaced apart. In some embodiments, the flow-through holes 122, 124, 126, and 128 can be about 90 degrees apart, about 80 degrees apart, about 70 degrees apart, about 60 degrees apart, about 50 degrees apart, about 40 degrees apart, about 30 degrees apart, about 20 degrees apart, or about 10 degrees apart. In some embodiments, the flow-through holes 122, 124, 126, and 128 can be spaced between about 70 to 75 degrees. In an example embodiment, the flow-through holes 122, 124, 126, and 128 can be about 72 degrees spaced.

Figure 4A:
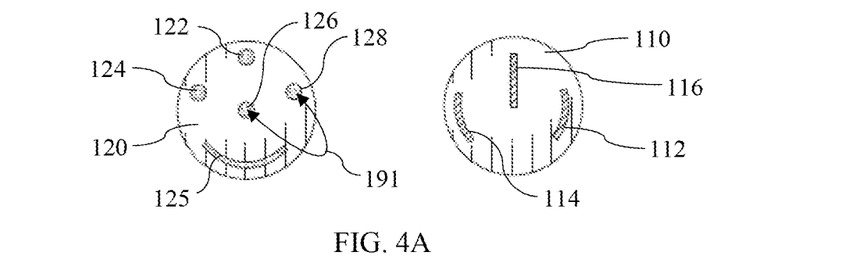
FIG. 4A-4D illustrates several configurations of the valve of FIG. 1.

Additionally, the third-through hole 126 and the fourth flow-through hole 128 can be in fluid communication with each other through the second conduit 194, the fourth conduit 198, and an external loop conduit 191 (see FIG. 4A). The external loop conduit 191 can be provided in the form of a tube or a conduit connecting one or more conduits. For example, the external loop conduit 191 can be a tube provided external to the housing 190 that connects the second conduit 194 with the third conduit 196. As can be appreciated, this is but one configuration, depending on the specification, flow-through holes can be paired with appropriate conduits.

A stator conduit 125 can also be provided on a surface (such as the first surface 121 or the second surface 123) of the stator 120. The stator conduit 125 can be a recessed pathway (such as a channel or a groove) that is deep enough to permit fluid communication there through. In some embodiments, the stator conduit 125 does not bore through the stator 120 from one side to another but merely permits fluid communication on the same surface (such as the second surface 123) of the stator 120. In some embodiments shown in FIG. 3, the stator conduit 125 can be curved to correspond to an outer shape of the stator 120 (such as circular or round).

The rotor 110 can include a first surface 111 and a second surface 113 opposite from the first surface 111. One or more rotor conduits can be provided on one of the surfaces, while one or more drive features can be provided on the other surface. In the illustrated embodiment shown in FIG. 3, the first surface 111 can include a first rotor conduit 112, a second rotor conduit 114, and a third rotor conduit 116 on the first surface 111. Similar to the stator conduit 125, the first rotor conduit 112, the second rotor conduit 114, and the third rotor conduit 116 can each be a recessed pathway (such as a channel or a groove) that is deep enough to permit fluid communication therethrough. Likewise, in some embodiments, the first rotor conduit 112, the second rotor conduit 114, and the third rotor conduit 116 do not bore through the rotor 110 from one side to another, but merely permit fluid communication on the same surface (such as the first surface 111) of the stator 110. In some embodiments, the first rotor conduit 112 and the second rotor conduit 114 can each have a shape of an arc in an opposite direction, while a shape of the third rotor conduit 116 can be a generally straight line.

The rotor conduits 112, 114, and 116 can be spaced apart. In some embodiments, rotor conduits 112, 114, and 116 can be about 90 degrees apart, about 80 degrees apart, about 70 degrees apart, about 60 degrees apart, about 50 degrees apart, about 40 degrees apart, about 30 degrees apart, about 20 degrees apart, or about 10 degrees apart. In some embodiments, the rotor conduits 112, 114, and 116 can be spaced between about 70 to 75 degrees. In an example embodiment, the rotor conduits 112, 114, and 116 can be about 72 degrees spaced.

One or more drive features 118 can be provided on the second surface 113. The one or more drive features 118 can be mated with the drive shaft 160, allowing the motor 120 to drive the rotor 110. In some embodiments, the one or more drive features 118 can each be a bore that protrudes partway into the rotor 110 from the second surface 113 without boring through the rotor 110 entirely.

The one or more conduits of the valve housing 190 can be configured into a multitude of configurations via the valve 100 through manipulating a relative position of the rotor 110 relative to the stator 120. More specifically, through manipulating a rotational position of the rotor 110, the rotor conduit 112, 114, and 116 can each be aligned with different flow-through holes 122, 124, 126, and 128 of the stator 120 or the stator conduit 125. Moreover, the stator conduit 125 can have a dimension and can be positioned such that when the stator 120 is mated with the rotor 110, the stator conduit 125 can provide fluid communication between at least two of the first rotor conduit 112, the second rotor conduit 114, or the third rotor conduit 116 of the rotor 110.

Referring to FIG. 4A, for simplicity of illustration, a stator similar to the stator 120 is shown, including the first flow-through hole 122, the second flow-through hole 124, the third flow-through hole 126, and the fourth flow-through hole 128, and the stator conduit 125. Likewise, a rotor similar to the rotor 110 is shown, including the first rotor conduit 112, the second rotor conduit 114, and the third rotor conduit 116. Moreover, for the purpose of illustration, the first flow-through hole 122 can be designated as an "input", whereas the second flow-through hole 124 can be designated as an "output". Further, the third flow-through hole 126 and the fourth flow-through hole 128 can be designated as a "loop". It is to be appreciated that these designations are merely illustrative for their intended purpose in some embodiments, but variations can also be possible depending on the specific implementation.

Figure 4B:
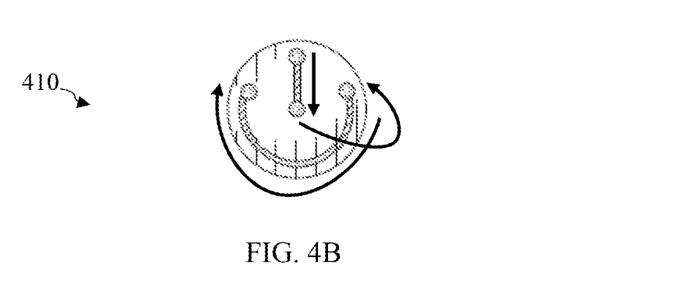
Figure 4C:
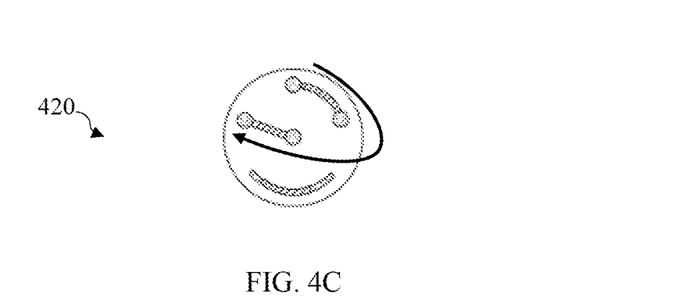
Figure 4D:
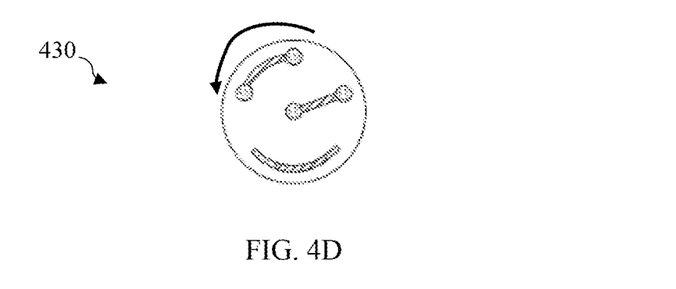

FIGS. 4B-4D illustrate several possible examples configurations of the valve 100. FIG. 4B illustrates a first configuration 410 (or a "Forward Through Loop" configuration). In the first configuration 410, a fluid can flow from the first flow-through hole 122 (i.e., the input in this example) through the third rotor conduit 116 to the third flow-through hole 126. Therefrom, the fluid can flow from the third flow-through hole 126 through the external loop conduit 191 (i.e., the loop in this example) to the fourth flow-through hole 128. And from the fourth flow-through hole 128 through the first rotor conduit 112, the stator conduit 125, and then through the second rotor conduit 114 to the second flow-through hole 124 (i.e., the output in this example). The example conduit of the fluid is illustrated by arrows in FIG. 4B. As can be appreciated, the fluid can also flow in a reverse direction by reversing the input and the output. This position allows the entire conduit to be utilized between the input and the output with no dead-spaces or dead volume in the active flow path. Thus, the first configuration can be advantageous in that it can reduce the rinsing/cleaning fluid volumes required.

In one example embodiment, an approximately 72 degree spacing is utilized between the three open positions. With 72 degree slots, each of the three flow configurations all provide full cleanout and no dead volume. This angle can provide optimal characteristics in all positions. The invention is not limited to 72 degrees, as other degree positions are contemplated and used.

FIG. 4C illustrates a second configuration 420 (or a "Reverse Through Loop" configuration). In the second configuration 420, a fluid can flow from the first flow-through hole 122 (i.e., the input in this example) through the first rotor conduit 112 to the fourth flow-through hole 128. Therefrom, the fluid can flow the fourth flow-through hole 128 through the external loop conduit 191 (i.e., the loop in this example) to the third flow-through hole 126. And from the third flow-through hole 126 through the third rotor conduit 116 to the second flow-through hole 124 (i.e., the output in this example). In this configuration, the fluid flow the external loop conduit 191 in a direction opposite that of the first configuration 410. Similar to the first configuration 410, the input and the output in the second configuration 420 can be reversed, thus reversing the entire flow path. To traverse from the first configuration 410 to the second configuration 420, the rotor 110 can be rotated clockwise or counterclockwise to achieve the second configuration 420. As can be appreciated, in the second configuration 420, the stator conduit 125 and the second rotor conduit 114 are not utilized.

FIG. 4D illustrates a third configuration 430 (or a "Bypass Loop" configuration). In the third configuration 430, a fluid can flow from the first flow-through hole 122 (i.e., the input in this example) through the second rotor conduit 114 directly to the second flow-through hole 124 (i.e., the output in this example) without traveling through the external loop conduit 191 (i.e., the loop in this example. Similar to the first configuration 410 and the second configuration 420, the input and the output in the third configuration 430 can be reversed as well, thus reversing the overall flow path. To traverse from the first configuration 410 or the second configuration 420 to the third configuration 430, the rotor 110 can be rotated clockwise or counterclockwise until the third configuration 420 is achieved. As can be appreciated, in the third configuration 430, the third flow-through hole 126, the fourth flow-through hole 128, the third rotor conduit 116, and the first rotor conduit 112 are not utilized.

In some embodiments, the motor 200 can be configured to place rotor 110 in a rotational position that corresponds to the first configuration 410, the second configuration 420, and the third configuration 430.

Although three configurations are shown in FIGS. 4B-C, additional configurations with the same rotor 110 and stator 120 can also be possible. For example, by stopping the rotor 110 between the positions shown in FIGS. 4B-4D, a dead-ended input or output position could be an option. Alternative or additional configurations can also be implemented. Some variations can include repurposing the input and/or the output and loop, these and other variations are within the scope of this disclosure.

Figure 5:
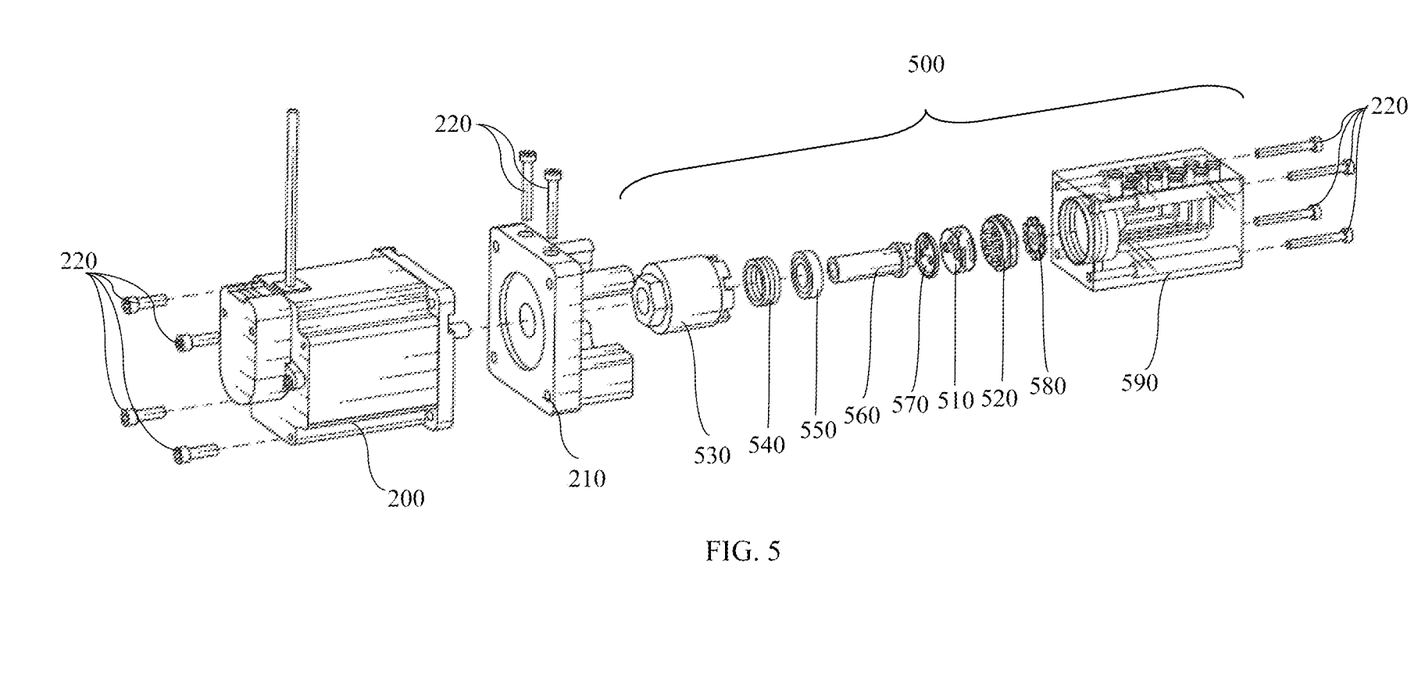
FIG. 5 illustrates a perspective exploded view of a 10-way valve, according to another example embodiment.
Figure 6:
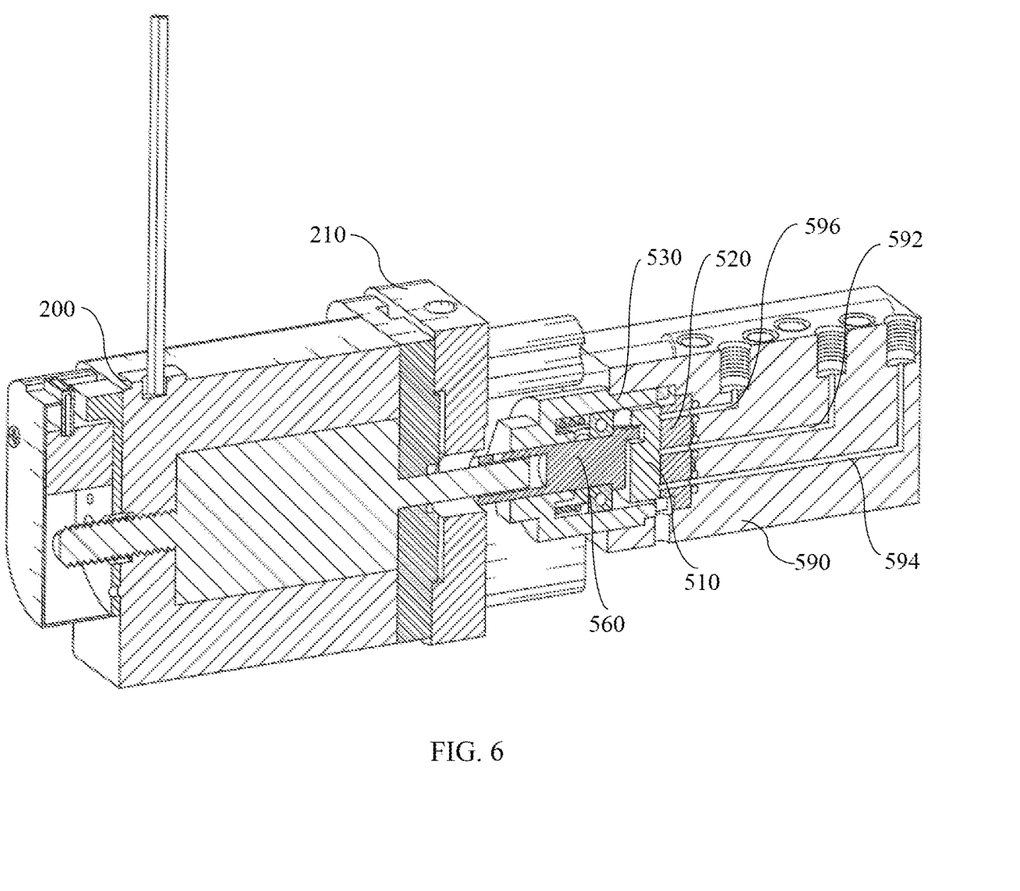
FIG. 6 illustrates a cross-sectional view of the 10-way valve of FIG. 5.

FIGS. 5 and 6 illustrate a valve 500 according to another example embodiment. Similar to the valve 100, the valve 500 can include a rotor 510 and a stator 520. The rotor 510 can be coupled to a valve cap 530 via a spring 540, a bearing 550, a drive shaft 560, and a thrust washer 570. The stator 520 can be coupled to a stator seal 580 and a valve housing 590. The valve 500 can similarly be coupled to the motor 200 through the motor mount 210.

As shown in FIGS. 5 and 6, a primary difference between the valve 100 and the valve 500 can be the valve housing 590 can include a different number of conduits than the valve housing 190. Referring to FIG. 6, the valve housing 590 can include a first conduit 592, a second conduit 594, and a third conduit 596. For example, the valve housing 590 can include ten conduits corresponding to "inputs", one conduit corresponding to an "output" that can be provided at a center of the conduits. One or more external tubes can be provided that connects two conduits to create a "loop". Again, as can be appreciated, the designation of "inputs" versus "outputs" merely denotes their intended purposes, and can be rearranged, mixed-and-matched, and varied by those skilled in the art. The invention is not limited to ten conduits.

The stator 520 can include a plurality of flow-through holes depending on the number of the conduit in the valve housing 590. In some embodiments, the stator 520 can include ten (10) flow-through holes, each corresponding to a conduit. The stator 520 can also include one or more rotor conduits similar to the rotor 520. Likewise, the rotor 510 can include a plurality of rotor conduits similar to the rotor 110.

In the illustrated embodiments shown in FIGS. 5 and 6, the motor 200 can be configured to rotate the rotor 510 into ten (10) rotational positions. Other suitable configurations can also be possible depending on the specific implementations.

Specific embodiments of a clean rinsing reversing bypass rotary valve according to this disclosure have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass this disclosure and any and all modifications, variations, or equivalents that fall within the spirit and scope of the basic underlying principles disclosed and claimed herein.

What is claimed is:
1. A valve comprising:
a rotor coupled to a stator, the stator including
a first surface opposite a second surface, the second surface defining a stator conduit, the stator conduit being a blind groove fluidly isolated from the first surface; and
an external loop in fluid communication with the stator,
wherein the rotor and the stator are configured to form a first configuration having a first fluid pathway and a second configuration having a second fluid pathway such that the first fluid pathway is different from the second fluid pathway,
wherein the stator further comprises a first flow-through hole, a second flow-through hole, a third flow-through hole, and a fourth flow-through hole,
wherein the rotor further comprises a first rotor conduit, a second rotor conduit, and a third rotor conduit, each provided on a surface of the rotor,
wherein the first configuration is formed by the first flow-through hole being in fluid communication with the third flow-through hole through the third rotor conduit, the third flow-through hole being in fluid communication with the fourth flow-through hole through the external loop, the fourth flow-through hole being in fluid communication with the second flow-through hole through the first rotor conduit, the stator conduit, and the second rotor conduit.
2. The valve of claim 1, wherein the rotor and the stator are further configured to form a third configuration having a third fluid pathway different from the first fluid pathway or the second fluid pathway.
3. The valve of claim 2, wherein the rotor is rotatable and the first configuration, the second configuration, and the third configuration are formed depending on a rotational position of the rotor relative to the stator.

4. The valve of claim 1, wherein the stator is at least partially non-cylindrical.

5. The valve of claim 1, wherein the stator conduit is arcuate.

6. The valve of claim 1, wherein the rotor and the stator are each at least partially cylindrical, and the rotor has a first diameter substantially equal to a second diameter of the stator.

7. The valve of claim 1, wherein two of the first flow-through hole, the second flow-through hole, the third flow-through hole, or the fourth flow-through hole are coupled to a tube forming the external loop external of the valve.

8. The valve of claim 1, wherein the external loop is in fluid communication with, the stator via a housing conduit.

9. The valve of claim 1, wherein the second configuration is formed by the first flow-through hole being in fluid communication with the fourth flow-through hole through the first rotor conduit, the fourth flow-through hole being in fluid communication with the third flow-through hole through the external loop, and the third flow-through hole being in fluid communication with the second flow-through hole through the third rotor conduit.

10. The valve of claim 1, wherein the second configuration is formed by the first flow-through hole being in fluid communication with the second flow-through hole through the second rotor conduit.

11. The valve of claim 1, further comprising:
a housing coupled to the stator, wherein the housing comprising a plurality of conduits each coupled to one of the first flow-through hole, the second flow-through hole, the third flow-through hole, and the fourth flow-through hole.

12. A method for creating a flow path comprising:
providing a rotor and a stator, the stator including
a first surface opposite a second surface, the second surface defining a stator conduit, the stator conduit being a blind groove fluidly isolated from the first surface;
providing an external loop in fluid communication with the stator; and
providing a first fluid pathway and a second fluid pathway by rotating the rotor relative to the stator, wherein the first fluid pathway is different from the second fluid pathway,
wherein the stator also includes a first flow-through hole, a second flow-through hole, a third flow-through hole, and a fourth flow-through hole,
wherein the rotor also includes a first rotor conduit, a second rotor conduit, and a third rotor conduit, each provided on a surface of the rotor,
wherein the first fluid pathway is formed by rotating the rotor such that the first flow-through hole is in fluid communication with the third flow-through hole through the third rotor conduit, the third flow-through hole is in fluid communication with the fourth flow-through hole through the external loop, the fourth flow-through hole is in fluid communication with the second flow-through hole through the first rotor conduit, the stator conduit, and the second rotor conduit.

13. The method of claim 12 further comprising:
providing a third fluid pathway by rotating the rotor relative to the stator, wherein the third fluid pathway is different from the first fluid pathway or the second fluid pathway.

14. The method of claim 13, wherein the third fluid pathway is formed by rotating the rotor such that the first flow-through hole is in fluid communication with the second flow-through hole through the second rotor conduit.

15. The method of claim 12, wherein the stator is at least partially non-cylindrical.

16. The method of claim 12, wherein the rotor and the stator are each at least partially cylindrical, and the rotor has a first diameter substantially equal to a second diameter of the stator.

17. The method of claim 12, wherein:
providing the external loop in fluid communication with the stator includes coupling two of the two of the first flow-through hole, the second flow-through hole, the third flow-through hole, or the fourth flow-through hole.

18. The method of claim 12, the external loop is in fluid communication with the stator via a housing.

19. The method of claim 12, wherein the second fluid pathway is formed by rotating the rotor such that the first flow-through hole is in fluid communication with the fourth flow-through hole through the first rotor conduit, the fourth flow-through hole is in fluid communication with the third flow-through hole through the external loop, and the third flow-through hole being in fluid communication with the second flow-through hole through the third rotor conduit.

20. The method of claim 12, further comprising:
providing a housing, wherein the housing comprising a plurality of conduits each coupled to one of the first flow-through hole, the second flow-through hole, the third flow-through hole, and the fourth flow-through hole.

* * * * *